(12) United States Patent
Shih et al.

(10) Patent No.: US 10,809,586 B2
(45) Date of Patent: Oct. 20, 2020

(54) MIRROR DISPLAY MODULE

(71) Applicant: Au Optronics Corporation, Hsinchu (TW)

(72) Inventors: Jen-Hao Shih, Hsinchu (TW); Chun-Lung Huang, Hsinchu (TW); Liang-Yin Huang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 158 days.

(21) Appl. No.: 16/231,596

(22) Filed: Dec. 23, 2018

(65) Prior Publication Data
US 2019/0196290 A1    Jun. 27, 2019

(30) Foreign Application Priority Data
Dec. 25, 2017   (TW) .............................. 106145503 A

(51) Int. Cl.
G02F 1/15      (2019.01)
G02F 1/157     (2006.01)
G02F 1/1335    (2006.01)
G02B 5/30      (2006.01)

(52) U.S. Cl.
CPC .......... G02F 1/157 (2013.01); G02B 5/3058 (2013.01); G02F 1/133528 (2013.01); G02F 1/133553 (2013.01); G02F 2001/13356 (2013.01); G02F 2001/133548 (2013.01); G02F 2201/44 (2013.01); G02F 2203/02 (2013.01)

(58) Field of Classification Search
CPC . G02B 5/3058; G02F 1/157; G02F 1/133528; G02F 1/133553; G02F 2001/133548; G02F 2001/13356; G02F 2201/44; G02F 2203/02

USPC .................................................. 359/265–275
See application file for complete search history.

(56) References Cited

U.S. PATENT DOCUMENTS

| 7,423,707 | B2 | 9/2008 | Yoon |
| 9,001,290 | B2 | 4/2015 | Lee et al. |
| 2005/0195345 | A1 | 9/2005 | Chiang et al. |

FOREIGN PATENT DOCUMENTS

| TW | I249054 | 2/2006 |
| TW | I252445 | 4/2006 |
| TW | I361921 | 4/2012 |

(Continued)

*Primary Examiner* — William Choi
(74) *Attorney, Agent, or Firm* — JCIPRNET

(57) ABSTRACT

A mirror display module including a first substrate, pixel units, a second substrate, a display medium layer, a reflection pattern, a third substrate, an electrochromic material layer, a first transparent electrode, and a second transparent electrode is provided. The pixel units are disposed on the first substrate. The second substrate is disposed opposite to the first substrate. The display medium layer is located between the first substrate and the second substrate. The reflection pattern is located between the second substrate and the display medium layer. The reflection pattern has a plurality of openings, and the plurality of openings is overlapped with at least a portion of the plurality of pixel units. The second substrate is located between the third substrate and the first substrate. The electrochromic material layer is located between the third substrate and the second substrate. The first transparent electrode is located between the third substrate and the electrochromic material layer. The second transparent electrode is located between the electrochromic material layer and the second substrate.

20 Claims, 10 Drawing Sheets

(56) References Cited

FOREIGN PATENT DOCUMENTS

| | | |
|---|---|---|
| TW | 201626083 | 7/2016 |
| TW | I551932 | 10/2016 |

MIRROR DISPLAY MODULE

CROSS-REFERENCE TO RELATED APPLICATION

This application claims the priority benefit of Taiwan application serial no. 106145503, filed on Dec. 25, 2017. The entirety of the above-mentioned patent application is hereby incorporated by reference herein and made a part of this specification.

BACKGROUND OF THE INVENTION

Field of the Invention

The invention relates to a display module, and more particularly, to a mirror display module.

Description of Related Art

Electrochromism refers to the stable and reversible change occurring to the optical properties (such as transmittance, reflectance, or absorbance) of an electrochromic material layer in the visible light wavelength range when external voltage or current is applied such that the electrochromic material layer can display changes in color and transparency. The electrochromic technique can be applied in many situations such as energy-saving windows and rear-view mirrors.

In general, the electrochromic device includes a front substrate, a rear substrate opposite to the front substrate, a front electrode disposed on the front substrate, a rear electrode disposed on the rear substrate, and an electrochromic material layer clamped between the front and rear electrodes. When sufficient voltage difference exists between the front and rear electrodes, an electrochemical redox reaction occurs to the electrochromic material layer such that the energy level thereof is changed, and the electrochromic material layer enters a dimming state. When an ambient light beam is transferred to the electrochromic material layer, the ambient light beam is absorbed by the electrochromic material layer in dimming state so as to switch to anti-glare mode. Moreover, when a voltage difference substantially does not exist between the front and rear electrodes, the electrochromic material layer enters a transparent state. At this point, the ambient light beam passes through the electrochromic material layer and is reflected by a rear electrode so as to switch to mirror mode.

In the case of a rear-view mirror in a vehicle, to provide an image display function in addition to anti-glare mode and mirror mode, the rear-view mirror needs to include a display device in addition to the electrochromic device. To allow the display light beam from the display device to pass through the electrochromic device to provide a display image, the front substrate, rear substrate, front electrode, and rear electrode of the electrochromic device all need to be transparent. In other words, the rear electrode is a transflective electrode, such as silver having a thickness of 100 Å to 200 Å. However, the transmittance of the transflective electrode is low, and therefore the display device needs to provide a high-energy display light beam such that the display light beam can still have sufficient intensity after passing through the electrochromic device to provide a good display image. When the display device provides a high-energy display light beam, the power consumption thereof is high, and the issue of overheating readily occurs. Moreover, to provide a high-energy display light beam, the display device requires a greater number of light sources (such as more LEDs), and therefore the issue of large size occurs.

SUMMARY OF THE INVENTION

The invention provides a mirror display module with good performance.

A mirror display module of the invention includes a display device and an electrochromic device disposed on the display device. The display device includes a first substrate, pixel units, a second substrate, a display medium layer, and a reflection pattern. The electrochromic device includes a third substrate, an electrochromic material layer, a first transparent electrode, and a second transparent electrode. The pixel units are disposed on the first substrate. The second substrate is disposed opposite to the first substrate. The display medium layer is located between the first substrate and the second substrate. The reflection pattern is disposed on the second substrate and located between the second substrate and the display medium layer. The reflection pattern has a plurality of openings, and the plurality of openings is overlapped with at least a portion of the plurality of pixel units. The second substrate is located between the third substrate and the first substrate. The electrochromic material layer is located between the third substrate and the second substrate. The first transparent electrode is disposed on the third substrate and located between the third substrate and the electrochromic material layer. The second transparent electrode is located between the electrochromic material layer and the second substrate.

A mirror display module of the invention includes a display device and an electrochromic device disposed on the display device. The display device includes a first substrate, pixel units, a second substrate, a display medium layer, and a reflection pattern. The electrochromic device includes a third substrate, an electrochromic material layer, a first transparent electrode, and a second transparent electrode. The pixel units are disposed on the first substrate. The second substrate is disposed opposite to the first substrate. The display medium layer is located between the first substrate and the second substrate. The reflection pattern is disposed on the second substrate and located between the second substrate and the display medium layer. The reflection pattern has a plurality of openings, and the plurality of openings is overlapped with at least a portion of the plurality of pixel units. The second substrate is located between the third substrate and the first substrate. The electrochromic material layer is located between the third substrate and the second substrate. The first transparent electrode is disposed on the third substrate and located between the third substrate and the electrochromic material layer. The second transparent electrode is located between the electrochromic material layer and the second substrate. A plurality of pixel units forms a plurality of pixel groups, each of the pixel groups includes a first pixel unit and a second pixel unit, an opening of the reflection pattern is overlapped with the first pixel unit, and the material portion of the reflection pattern shields the second pixel unit.

In an embodiment of the invention, the reflectance of the reflection pattern is greater than 50%.

In an embodiment of the invention, the mirror display module further includes a fourth substrate. The fourth substrate is located between the second transparent electrode and the second substrate.

In an embodiment of the invention, the mirror display module further includes a polarizer disposed between the reflection pattern and the display medium layer.

In an embodiment of the invention, the plurality of pixel units forms a plurality of pixel groups, each of the pixel groups includes a first pixel unit and a second pixel unit, an opening of the reflection pattern is overlapped with the first pixel unit, the material portion of the reflection pattern shields the second pixel unit, and the first pixel unit is configured to display a green color.

In an embodiment of the invention, the pixel groups are arranged in a plurality of columns and a plurality of rows, the plurality of first pixel units and the plurality of second pixel units of the plurality of pixel groups of each of the columns are alternately arranged in the column direction, and arrangements of first pixel units and second pixel units of any two adjacent rows are different.

In an embodiment of the invention, each of the pixel groups further includes a third pixel unit and a fourth pixel unit, the plurality of openings of the reflection pattern is overlapped with the third pixel unit and the fourth pixel unit, and the third pixel unit and the fourth pixel unit are configured to display a red color and a blue color.

In an embodiment of the invention, the plurality of third pixel units and the plurality of fourth pixel units of the plurality of pixel groups are alternately arranged in the column direction, and arrangements of third pixel units and fourth pixel units of any two adjacent rows are different.

In an embodiment of the invention, the mirror display module further includes a wire grid polarizer disposed between the second transparent electrode and the second substrate.

In an embodiment of the invention, the mirror display module further includes a wire grid polarizer disposed between the second substrate and the display medium layer.

In an embodiment of the invention, the wire grid polarizer and the reflection pattern are the same film layer.

In an embodiment of the invention, the second transparent electrode is directly disposed on the surface of the second substrate facing away from the display medium layer, and the second transparent electrode is in contact with the surface of the second substrate.

Based on the above, the mirror display module of an embodiment of the invention reflects an ambient light beam using a reflection pattern having an opening of the display device and does not reflect the ambient light beam using a transflective electrode of the electrochromic device of the prior art. Accordingly, the upper and lower electrodes (i.e., first transparent electrode and second transparent electrode) of the electrochromic device configured to drive the electrochromic material layer can both be transparent electrodes such that the transmittance of the electrochromic device is high. Accordingly, the display light beam from the display medium layer of the display device does not require excessive energy to penetrate the electrochromic device. Therefore, issues of the prior art such as power consumption, overheating, and large size can be alleviated.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
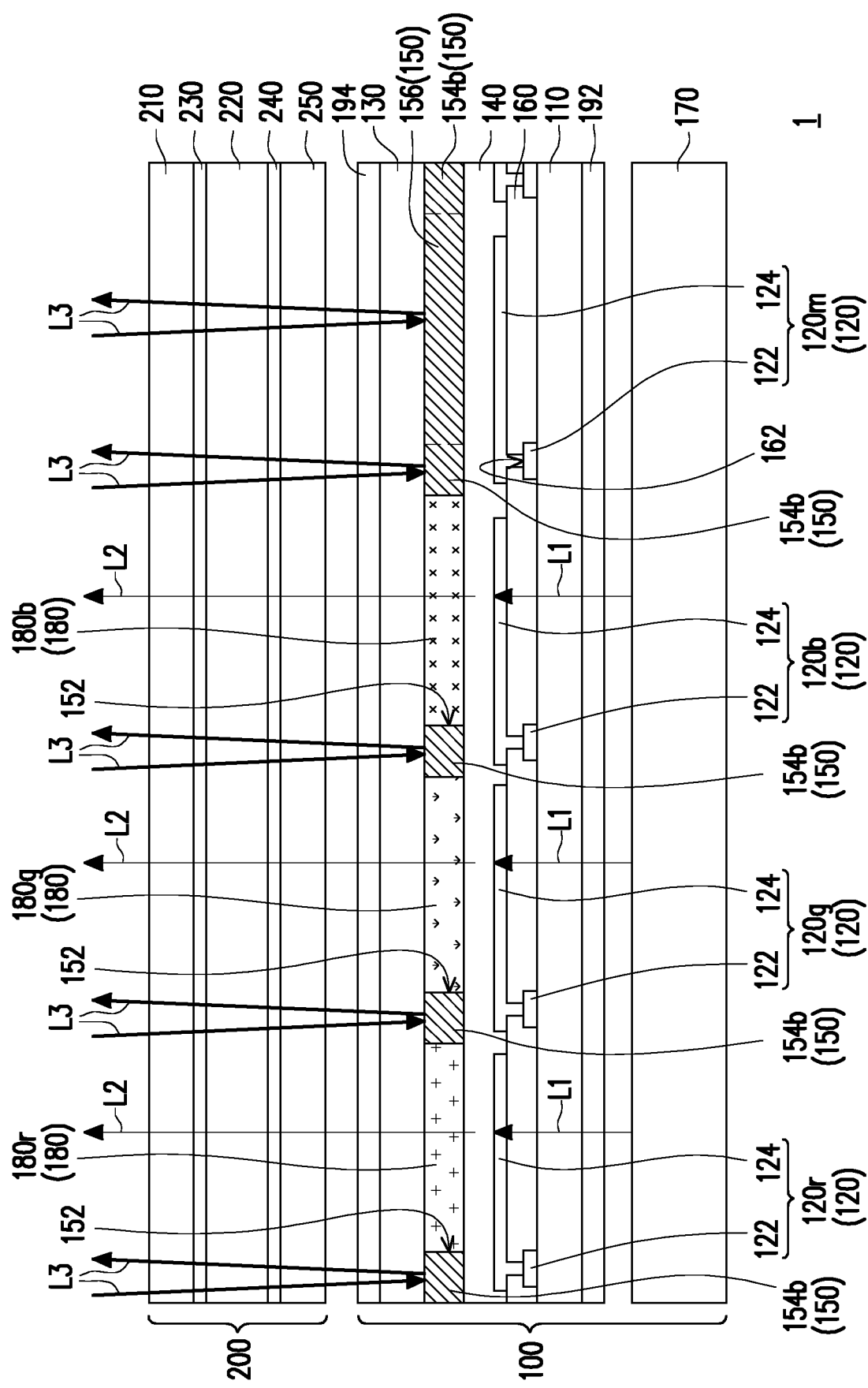
FIG. 1 is a cross section of a mirror display module of an embodiment of the invention.

Hereinafter, exemplary embodiments of the invention are described in detail, and examples of the exemplary embodiment are conveyed via the figures. Wherever possible, the same reference numerals are used in the drawings and the descriptions to refer to the same or similar portions.

Figure 2:
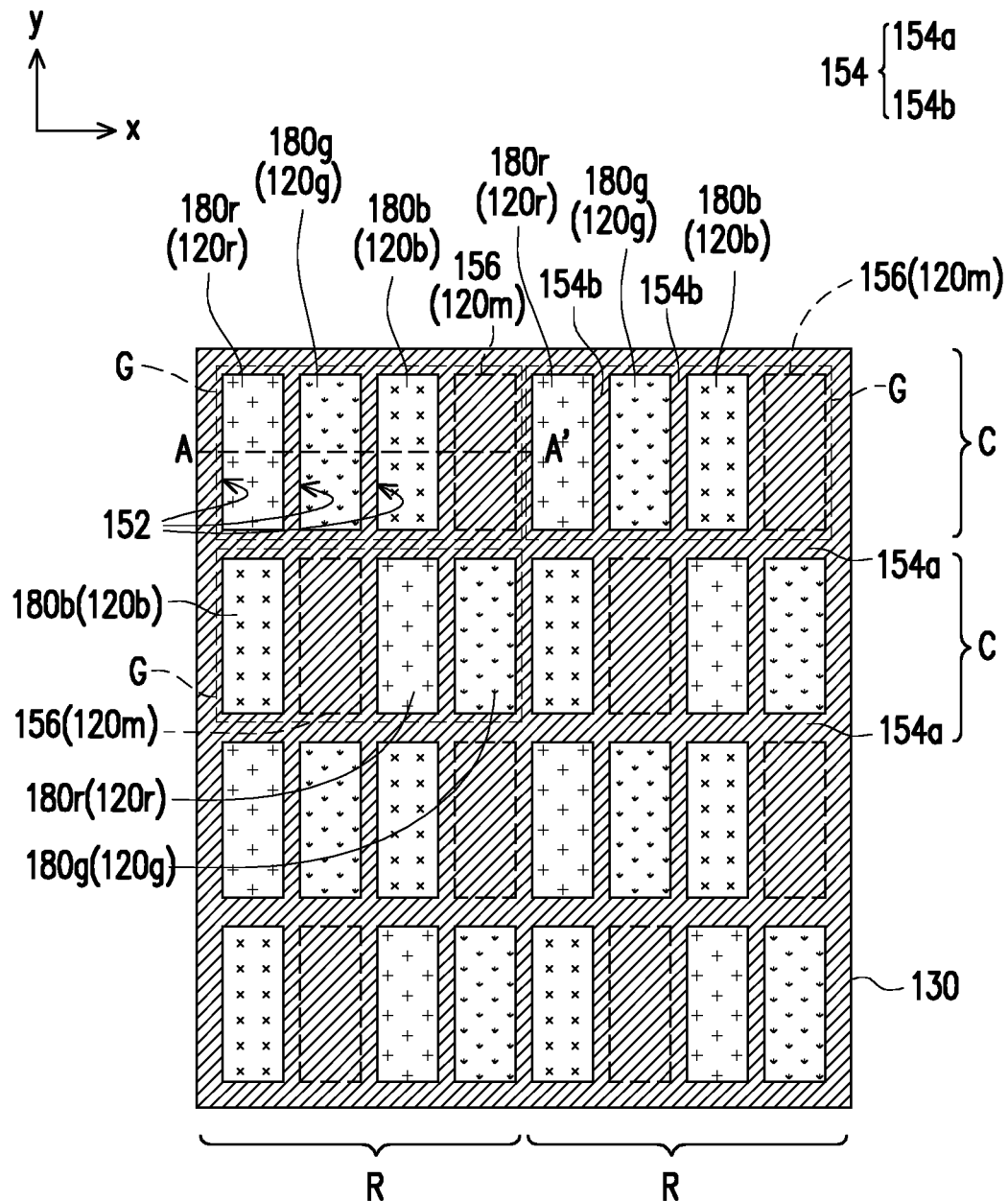
FIG. 2 is a top view of a display device of a mirror display module of an embodiment of the invention.

FIG. 1 is a cross section of a mirror display module of an embodiment of the invention. FIG. 2 is a top view of a display device of a mirror display module of an embodiment of the invention. The cross section of a display device 100 of FIG. 1 corresponds to the section line A-A' of FIG. 2.

Referring to FIG. 1, a mirror display module 1 includes the display device 100 and an electrochromic device 200 disposed on the display device 100. The display device 100 includes a first substrate 110, a plurality of pixel units 120 disposed on the first substrate 110, a second substrate 130 disposed opposite to the first substrate 110, a display medium layer 140 located between the first substrate 110 and the second substrate 130, and a reflection pattern 150 disposed on the second substrate 130.

The first substrate 110 is mainly configured to carry the pixel units 120. The second substrate 130 is mainly configured to carry the reflection pattern 150. In the present embodiment, the material of the first substrate 110 and/or the second substrate 130 can be glass, quartz, an organic polymer, an opaque/reflective material (such as a conductive material, wafer, ceramic, or other suitable materials), or other suitable materials.

In the present embodiment, the display medium layer 140 is, for instance, a liquid crystal layer, and the display device 100 can further include a first polarizer 192 and a second polarizer 194. The first polarizer 192 is disposed on the first substrate 110. In the present embodiment, the first substrate 110 can be located between the pixel units 120 and the first polarizer 192. The second polarizer 194 is disposed on the second substrate 130. In the present embodiment, the second substrate 130 can be located between the first polarizer 194 and the reflection pattern 150. However, the invention is not limited thereto, and in other embodiments, the display medium layer 140 can also be other suitable display material layers (such as an organic electroluminescent layer), and the first polarizer 192 and the second polarizer 194 in the display device 100 can also be disposed at other suitable locations, or the first polarizer 192 and the second polarizer 194 can be omitted.

In the present embodiment, each of the pixel units 120 can include a thin-film transistor 122 and a pixel electrode 124 electrically connected to the thin-film transistor 122. More specifically, in the present embodiment, the display device 100 further includes a plurality of data lines (not shown) disposed on the first substrate 110 and a plurality of scan lines (not shown) disposed on the first substrate 110 and intersected with the plurality of data lines. The thin-film transistor 122 has a source, a gate, and a drain. The source of the thin-film transistor 122 is electrically connected to the data lines. The gate of the thin-film transistor 122 is electrically connected to the scan lines. The drain of the thin-film transistor is electrically connected to the pixel electrode 124. For instance, in the present embodiment, an insulating layer 160 covers the thin-film transistor 122, and the pixel electrode 124 can be electrically connected to the thin-film transistor 122 via an opening 162 of the insulating layer 160, but the invention is not limited thereto.

Referring to FIG. 1 and FIG. 2, the reflection pattern 150 is disposed on the second substrate 130 and located between the second substrate 130 and the display medium layer 140. The reflection pattern 150 has a plurality of openings 152. The plurality of openings 152 is overlapped with at least a portion of pixel units 120r, 120g, and 120b. More specifically, the plurality of openings 152 of the reflection pattern 150 is respectively overlapped with the pixel electrode 124 of the pixel unit 120r, the pixel electrode 124 of the pixel unit 120g, and the pixel electrode 124 of the pixel unit 120b. A display light beam L2 from a portion of the display medium layer 140 above the pixel electrodes 124 of the pixel units 120r, 120g, and 120b can pass through the openings 152 of the reflection pattern 150 and the electrochromic device 200 to display an image. In the present embodiment, the display medium layer 140 can be a non-self-luminescent material layer (such as a liquid crystal layer), and the display device 100 can optionally include a backlight source 170. The backlight source 170 is configured to emit an illumination beam L1, and the illumination beam L1 passes through a portion of the display medium layer 140 on the pixel electrodes 124 of the pixel units 120r, 120g, and 120b to be converted into the display light beam L2. However, the invention is not limited thereto, and in other embodiments, the display medium layer 140 can also be a self-luminous material layer (such as an organic electroluminescent layer), and the backlight source 170 can also be omitted.

Referring to FIG. 1 and FIG. 2, the reflection pattern 150 includes a first material portion 154 defining the openings 152. For instance, in the present embodiment, the first material portion 154 includes a plurality of material sub-portions 154a extended in a row direction x and a plurality of material sub-portions 154b extended in a column direction y. The plurality of material sub-portions 154a and the plurality of material sub-portions 154b are staggered into a mesh. More specifically, the plurality of material sub-portions 154a and the plurality of material sub-portions 154b can shield the data lines and the scan lines. In the present embodiment, the reflection pattern 150 can further include a second material portion 156, and in addition to including the pixel units 120r, 120g, and 120b, the mirror display module 1 can further include a pixel unit 120m other than the pixel units 120r, 120g, and 120b, and the second material portion 156 shields the pixel unit 120m. Specifically, the second material portion 156 shields the pixel electrode 124 of the pixel unit 120m. However, the invention is not limited thereto, and in another embodiment, the reflection pattern 150 can also omit the second material portion 156 and only include the first material portion 154 without including the reflection pattern of the second material portion 156 to replace the reflection pattern 150 of the display device 100 of the present embodiment. The resulting display device and electrochromic device 200 can form another mirror display module which is also within the scope of the invention.

The reflection pattern 150 has high reflectance. For instance, in the present embodiment, the reflectance of the reflection pattern 150 is R %, and R %≥50%. Preferably, R %≥40%. However, the invention is not limited thereto. In the present embodiment, the material of the reflection pattern 150 can be silver, chromium, black chrome, ruthenium, stainless steel, titanium, nickel, molybdenum, nickel chromium, Inconel, indium, palladium, osmium, cobalt, cadmium, niobium, brass, bronze, tungsten, rhenium, iridium, aluminum, aluminum alloy, scandium, yttrium, zirconium, vanadium, manganese, iron, zinc, tin, lead, bismuth, antimony, rhodium, tantalum, copper, gold, platinum, platinum metal, other suitable reflective materials, or a combination thereof, and preferably can be copper, gold, platinum, aluminum, aluminum alloy, chromium, nickel, ruthenium, silver, silver alloy, or a combination thereof, but the invention is not limited thereto.

In the present embodiment, the display device 100 further includes a color filter layer 180 disposed on the second substrate 130 and located between the second substrate 130 and the display medium layer 140. In the present embodiment, the color filter layer 180 includes filter patterns 180r, 180g, and 180b respectively located in the plurality of openings 152 of the reflection pattern 150. The filter patterns 180r, 180g, and 180b are respectively overlapped with the pixel electrode 124 of the pixel unit 120r, the pixel electrode 124 of the pixel unit 120g, and the pixel electrode 124 of the pixel unit 120b. For instance, in the present embodiment, the filter patterns 180r, 180g, and 180b can respectively be a red filter pattern, a green filter pattern, and a blue filter pattern. In other words, the pixel units 120r, 120g, and 120b can respectively be configured to display a red color, a green color, and a blue color, but the invention is not limited thereto.

Referring to FIG. 1 and FIG. 2, in the present embodiment, the plurality of pixel units 120 forms a plurality of pixel groups G. Each of the pixel groups G includes pixel units 120r, 120g, 120b, and 120m. In the present embodiment, the openings 152 of the reflection pattern 150 are overlapped with the pixel unit 120g, the second material portion 156 of the reflection pattern 150 shields the pixel unit 120m, and the pixel unit 120g is configured to display a green color; the plurality of pixel units 120g and the plurality of pixel units 120m of the plurality of pixel groups G are alternately arranged in the column direction y, and the arrangement methods of any two adjacent rows C are different, i.e., the pixel units 120g and the pixel units 120m of two adjacent pixel groups G located in the same column R are alternately arranged in the column direction y; in other words, the plurality of pixel groups G is arranged into a plurality of columns R and a plurality of rows C along the staggered a row direction x and a column direction y, the plurality of pixel groups G in the same row C is arranged in the row direction x, the plurality of pixel groups G in the same column R is arranged in the column direction y, two pixel units 120m of two adjacent pixel groups G located in the same column R are dislocated from each other, two pixel units 120g of two adjacent pixel groups G located in the same column R are dislocated from each other, and two pixel units 120g and 120m of two adjacent pixel groups G located in the same column R can be aligned in the column direction y. More specifically, in the present embodiment, the pixel unit 120r and the pixel unit 120b are respectively configured to display a red color and a blue color, the pixel unit 120r and the pixel unit 120b are alternately arranged in the column direction y, and the arrangement methods of any two adjacent rows C are different. In other words, two pixel units 120r of two adjacent pixel groups G located in the same column R are dislocated from each other, two pixel units 120b of two adjacent pixel groups G located in the same column R are dislocated from each other, and two pixel units 120r and 120b of two adjacent pixel groups G located in the same column R can be aligned in the column direction y.

Via the configuration of the pixel unit 120m above (i.e., the second material portion 156), the chances of observing the second material portion 156 of the reflection pattern 150 by a human eye can be reduced so as to improve the visual effects of the mirror display module 1. However, the invention is not limited thereto, and in other embodiments, the pixel units 120r, 120g, 120b, and 120m (i.e., the filter pattern 180r, the filter pattern 180g, the filter pattern 180b, and the second material portion 156 of the reflection pattern 150 respectively overlapped with the pixel units 120r, 120g, 120b, and 120m) can also be arranged in other suitable methods, and examples are provided below with reference to other figures.

Referring to FIG. 1, the electrochromic device 200 includes a third substrate 210, an electrochromic material layer 220, a first transparent electrode 230, and a second transparent electrode 240. The second substrate 130 is located between the third substrate 210 and the first substrate 110. The electrochromic material layer 220 is located between the third substrate 210 and the second substrate 130. The first transparent electrode 230 is disposed on the third substrate 210 and located between the third substrate 210 and the electrochromic material layer 220. The second transparent electrode 240 is located between the electrochromic material layer 220 and the second substrate 130. In the present embodiment, the electrochromic device 200 further includes a fourth substrate 250 located between the second transparent electrode 240 and the second substrate 130, but the invention is not limited thereto.

An ambient light beam L3 from outside the mirror display module 1 can pass through the electrochromic device 200 and be reflected by the reflection pattern 150 of the display device 100. Accordingly, the mirror display module 1 can reflect the ambient light beam L3 to provide a mirror effect. For instance, in the present embodiment, the mirror display module 1 can be used as a rear-view mirror of a vehicle. However, the invention is not limited thereto, and in other embodiments, the mirror display module 1 can also be applied in other situations such as energy-saving windows and smart glass.

It should be mentioned that, the mirror display module 1 reflects the ambient light beam L3 using the reflection pattern 150 having the openings 152 of the display device 100 and does not reflect the ambient light beam L3 using a transflective electrode of the electrochromic device of the prior art. Therefore, the upper and lower electrodes (i.e., the first transparent electrode 230 and the second transparent electrode 240) of the electrochromic device 200 configured to drive the electrochromic material layer 220 can both be designed as transparent electrodes such that the transmittance of the electrochromic device 200 is high. Accordingly, the display light beam L2 from the display device 100 does not require excessive energy to pass through the electrochromic device 200 and be transferred to the user's eye to provide a display image. In other words, the display device 100 (i.e., the backlight source 170) does not require excessive energy to provide the display light beam L2 with sufficient intensity (i.e., the illumination beam L) for display. Therefore, issues such as power consumption, overheating, and large size of the prior art can be alleviated.

Figure 3:
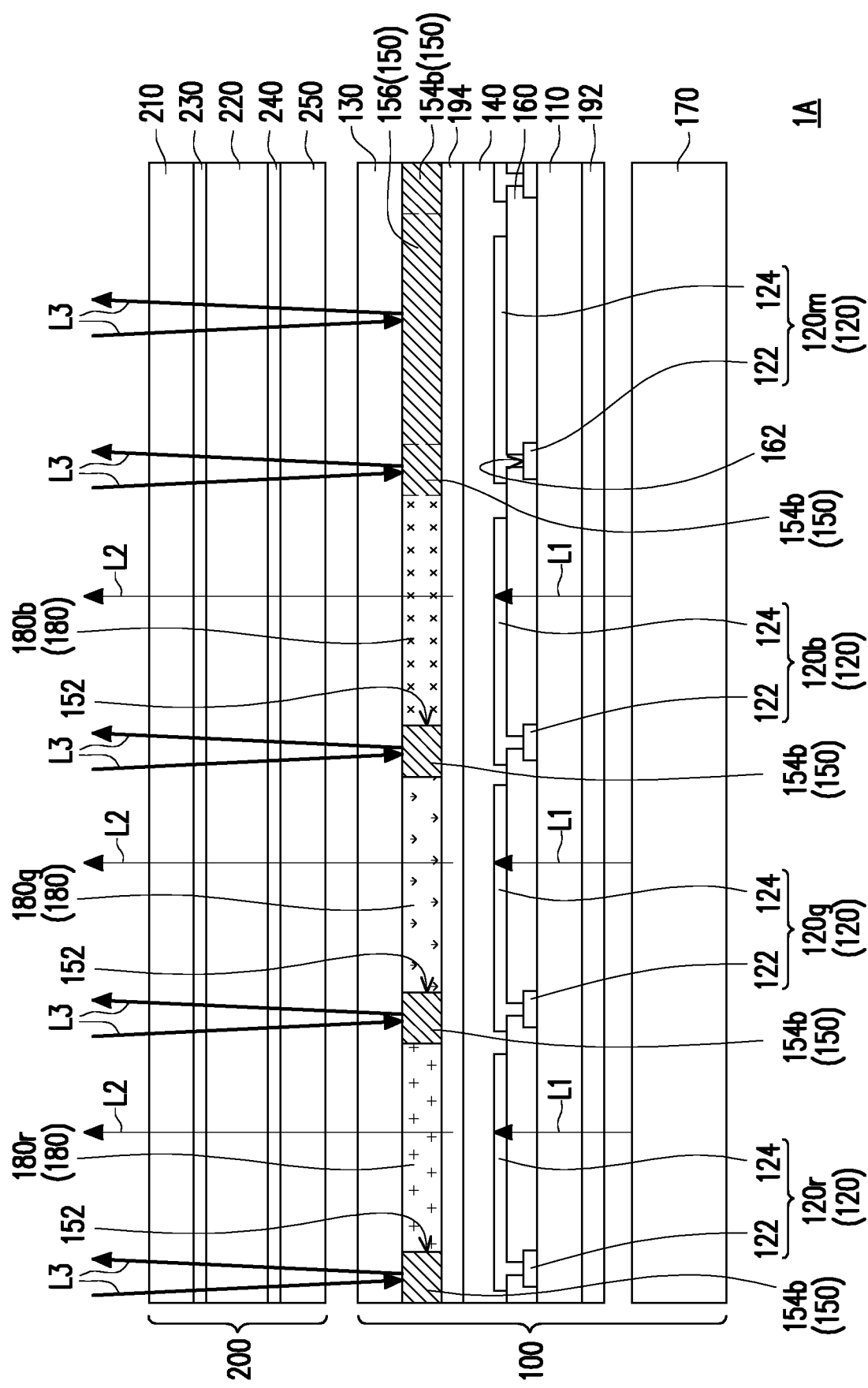
FIG. 3 is a cross section of a mirror display module of another embodiment of the invention.

FIG. 3 is a cross section of a mirror display module of another embodiment of the invention. Referring to FIG. 3, a mirror display module 1A of FIG. 3 is similar to the mirror display module 1 of FIG. 1, and the difference between the two is that, the polarizer 194 of the mirror display module 1A of FIG. 3 is disposed between the reflection pattern 150 and the display medium layer 140. In other words, the polarizer 194 of the display module 1A is an in-cell polarizer. Since the polarizer 194 is disposed between the reflection pattern 150 and the display medium layer 140, the ambient light beam L3 does not need to pass through the polarizer 194 before being reflected by the reflection pattern 150. Accordingly, in comparison to the mirror display module 1, the reflectance of the mirror display module 1A can be further increased to provide better mirror effects. In the present embodiment, the polarizer 194 can be formed by coating, but the invention is not limited thereto.

Figure 4:
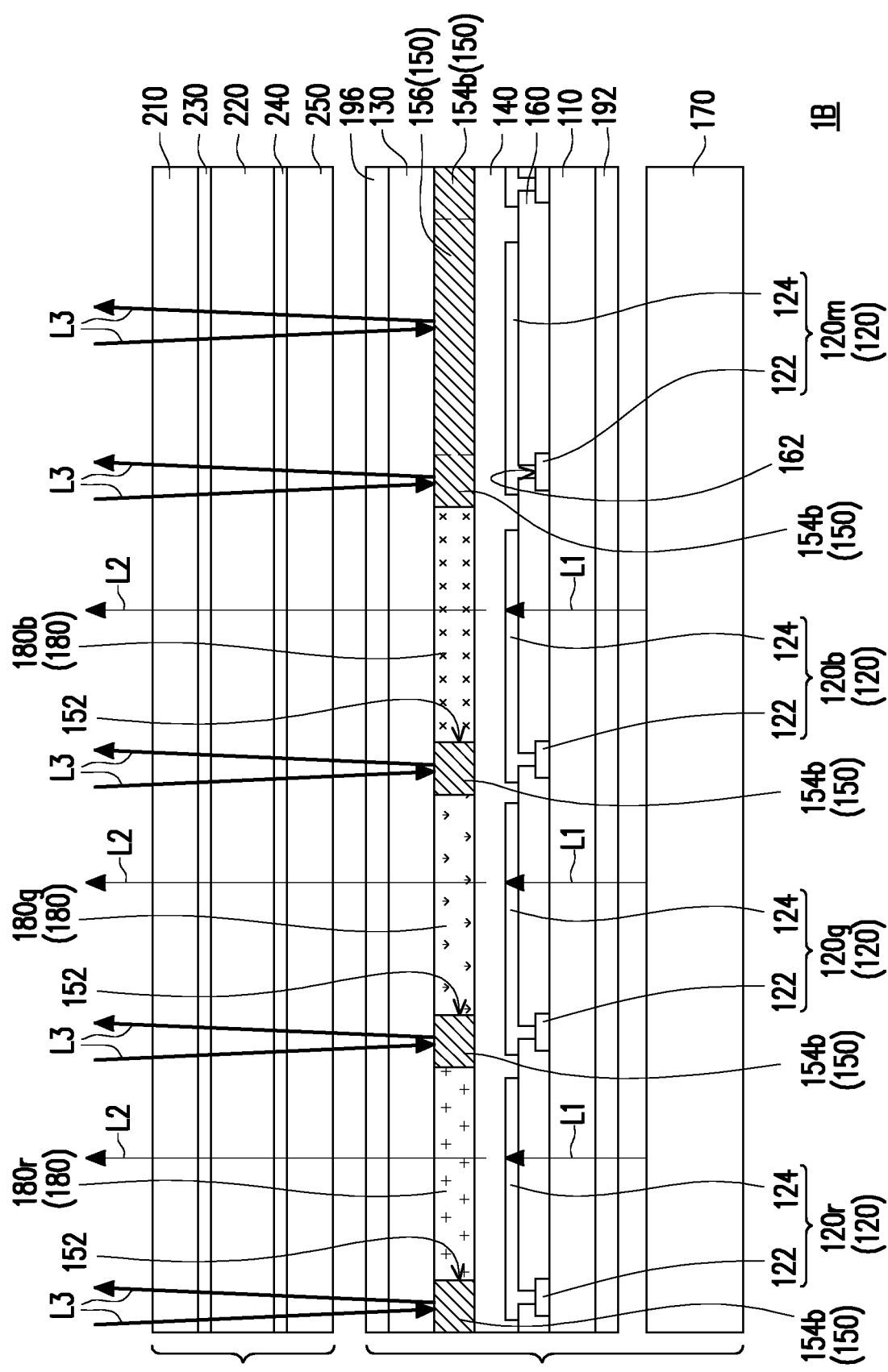
FIG. 4 is a cross section of a mirror display module of yet another embodiment of the invention.

FIG. 4 is a cross section of a mirror display module of yet another embodiment of the invention. Referring to FIG. 4, a mirror display module 1B of FIG. 4 is similar to the mirror display module 1 of FIG. 1, and the difference between the two is that, the display device 100 of the mirror display module 1B includes a wire grid polarizer 196 configured to replace the polarizer 194 of FIG. 1. In the present embodiment, the wire grid polarizer 196 can be located between the second transparent electrode 240 and the second substrate 130.

Figure 5:
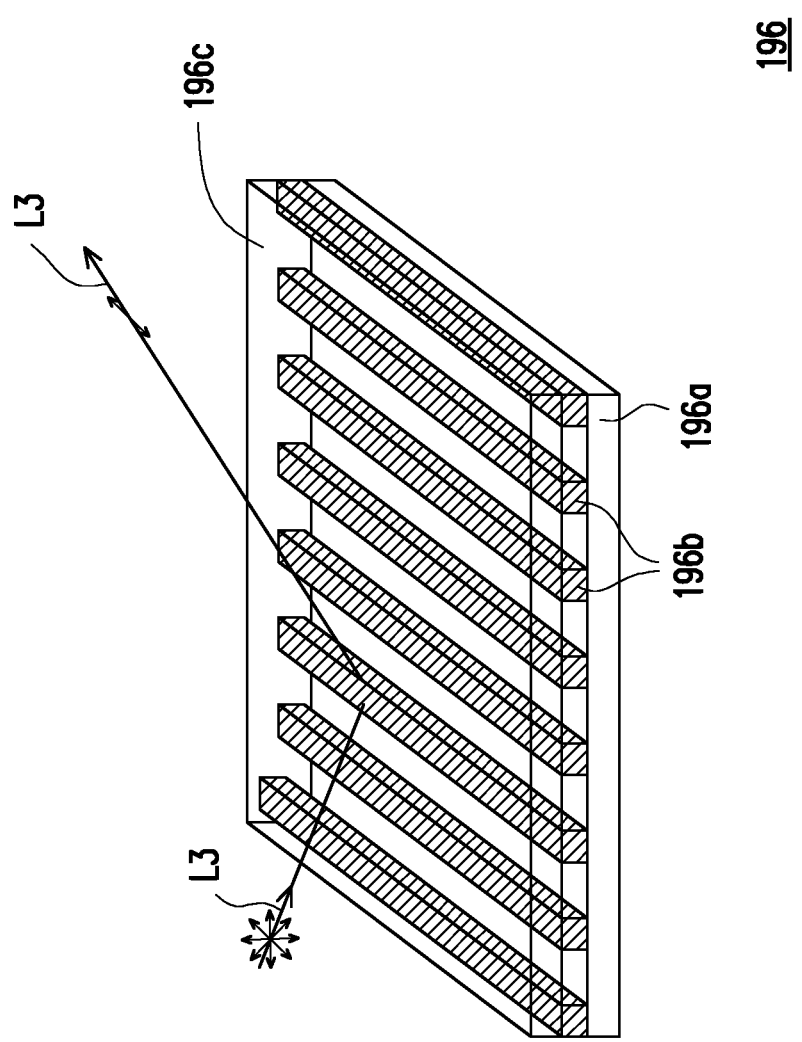
FIG. 5 is a 3D view of a wire grid polarizer of the mirror display module of FIG. 4.

FIG. 5 is a 3D view of a wire grid polarizer of the mirror display module of FIG. 4. Referring to FIG. 5, the wire grid polarizer 196 includes a transparent substrate 196a and a plurality of metal wires 196b disposed on the transparent substrate 196a. The plurality of metal wires 196b are separated from one another and parallel to one another. In the present embodiment, the polarizer 196 can further optionally include a protective layer 196c. The protective layer 196c is disposed on the transparent substrate 196a and covers the metal wires 196b. In the present embodiment, the wire grid polarizer 196 includes a transparent substrate 196a, but the invention is not limited thereto, and according to other embodiments, the wire grid polarizer 196 can also not include the transparent substrate 196a and the metal wires 196b are directly formed on the second substrate 130.

Referring to FIG. 5, the wire grid polarizer 196 has a polarizing effect. After the ambient light beam L3 without a specific polarization state (i.e., natural light) is reflected by the wire grid polarizer 196, an ambient light beam L3 having a specific polarization state is formed. Accordingly, the comfort of the user using the mirror display module 1B can be increased. More importantly, via the reflective property of the wire grid polarizer 196, the reflectance of the mirror display module 1B can be further increased.

Figure 6:
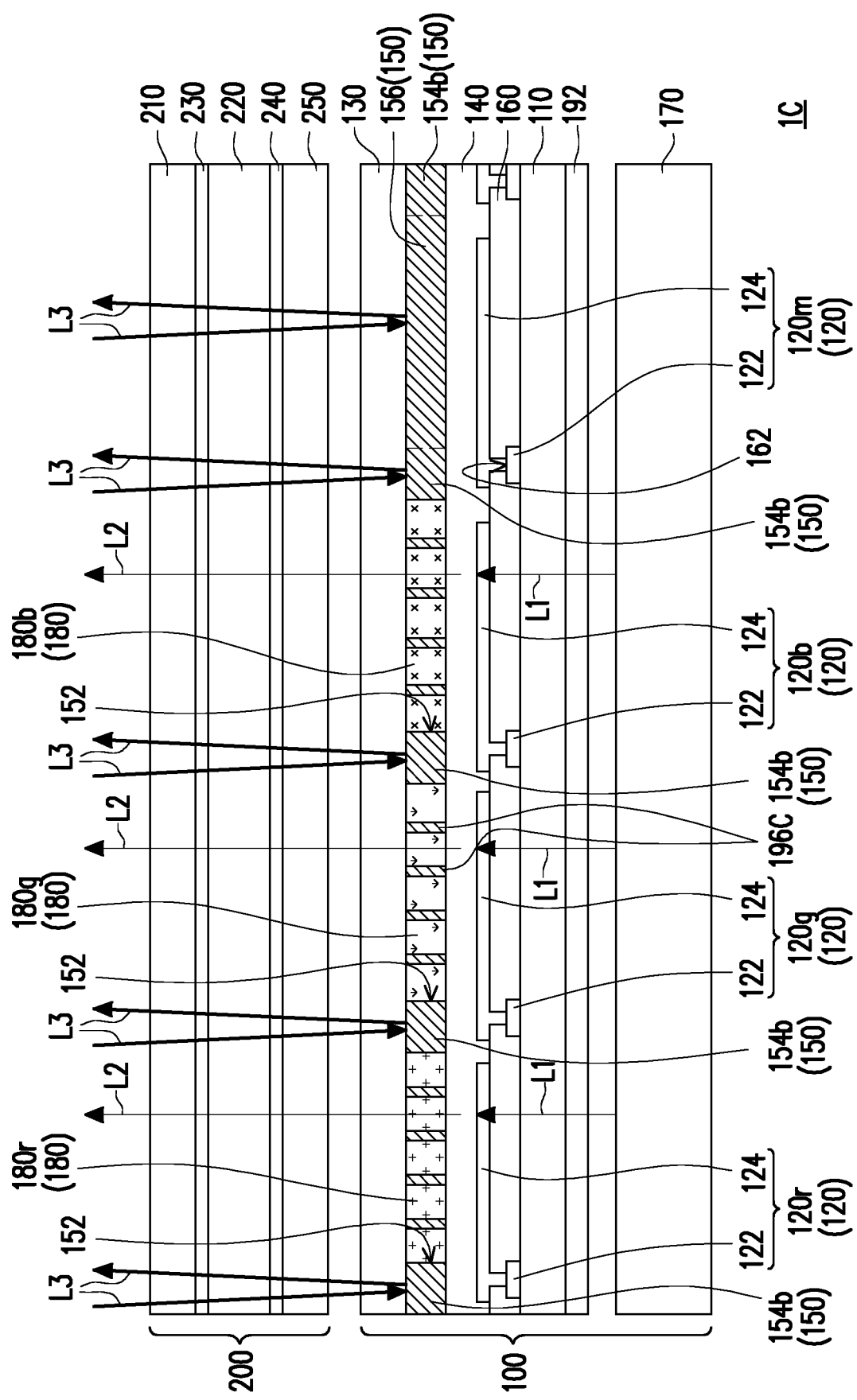
FIG. 6 is a cross section of a mirror display module of still yet another embodiment of the invention.

FIG. 6 is a cross section of a mirror display module of still yet another embodiment of the invention. Referring to FIG. 6, a mirror display module 1C of FIG. 6 is similar to the mirror display module 1 of FIG. 1, and the difference between the two is that, the mirror display module 1C does not include the polarizer 194 of FIG. 1, and the wire grid polarizer 196C is used to replace the function of the polarizer 194 of FIG. 1. The wire grid polarizer 196C is disposed between the second substrate 130 and the display medium layer 140. In other words, in the present embodiment, the wire grid polarizer 196C can be an in-cell polarizer. More specifically, in the present embodiment, the wire grid polarizer 196C and the reflection pattern 150 can be the same film layer. In other words, the wire grid polarizer 196C and the reflection pattern 150 can be made using the same process. Accordingly, not only is the process of the display device 100 simplified, since the wire grid polarizer 196C is disposed between the second substrate 130 and the display medium layer 140, the ambient light beam L3 does not need to pass through the polarizer before being reflected by the reflection pattern 150. Accordingly, in comparison to the mirror display module 1, the reflectance of the mirror display module 1C can be further increased to provide better mirror effects.

Figure 7:
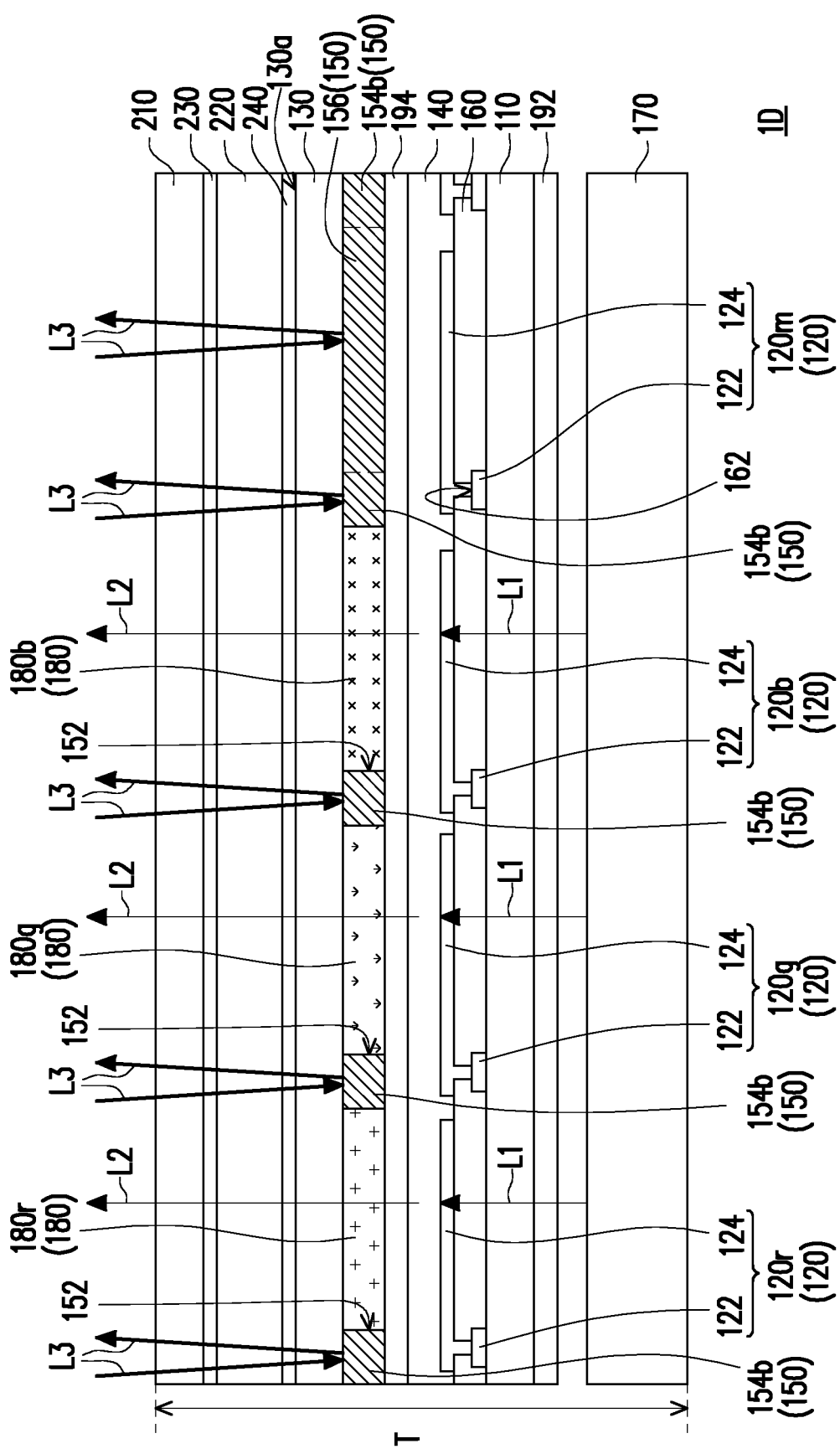
FIG. 7 is a cross section of a mirror display module of still yet another embodiment of the invention.

FIG. 7 is a cross section of a mirror display module of still yet another embodiment of the invention. Referring to FIG. 7, a mirror display module 1D of FIG. 7 is similar to the mirror display module 1A of FIG. 3, and the difference between the two is that, the electrochromic device 200 of the mirror display module 1D of FIG. 7 can omit the fourth substrate 250 of the electrochromic device 200 of FIG. 3 to directly dispose the second transparent electrode 240 on the surface 130a of the second substrate 130 facing away from the display medium layer 140, and the second transparent electrode 240 is in contact with the surface 130a of the second substrate 130. Accordingly, in comparison to the mirror display module 1A of FIG. 3, an overall thickness T of the mirror display module 1D of FIG. 7 can be reduced.

Figure 8:
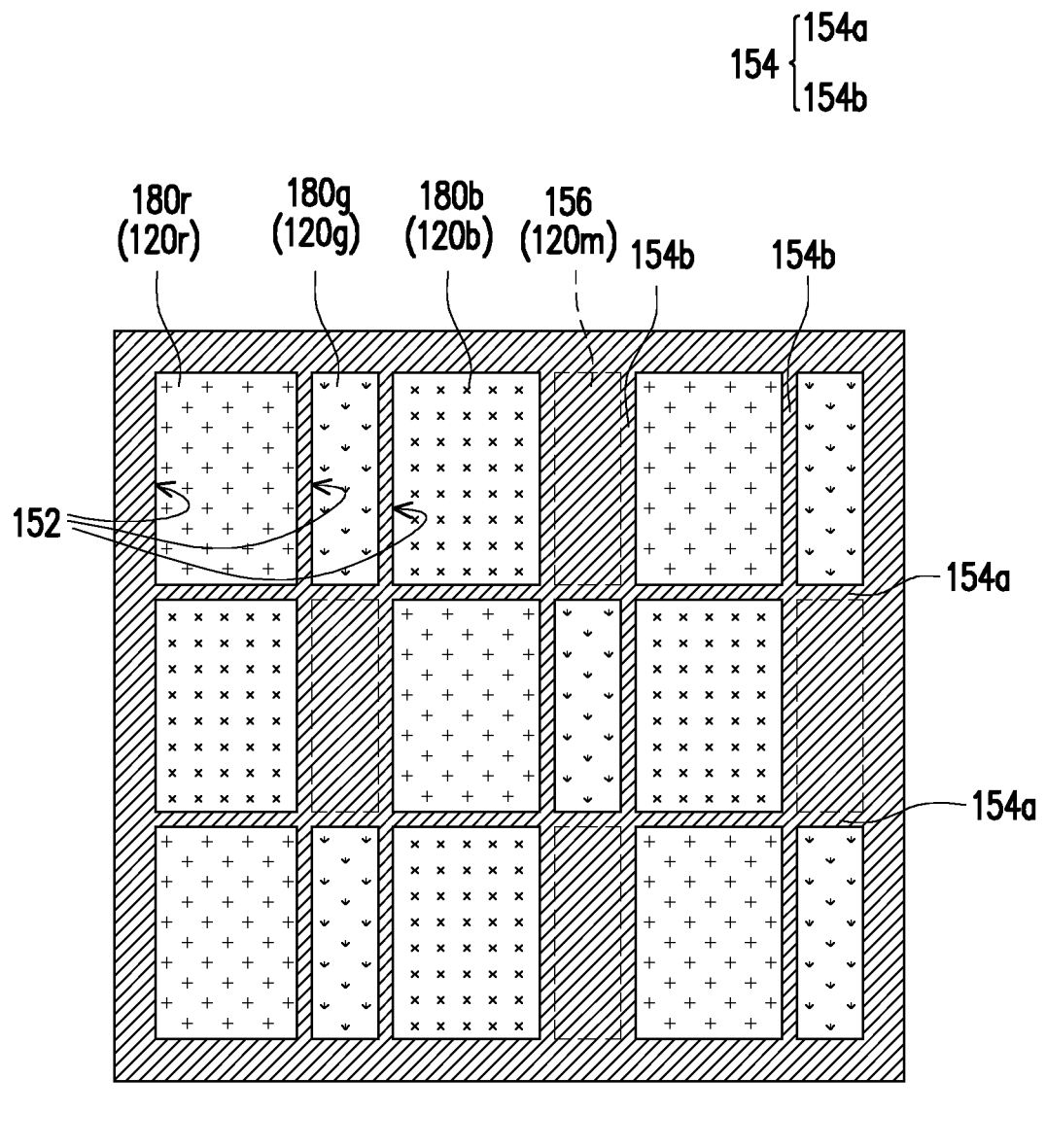
FIG. 8 is a top view of a display device of a mirror display module of another embodiment of the invention.

FIG. 8 is a top view of a display device of a mirror display module of another embodiment of the invention. Referring to FIG. 8, in the display device 100A, the arrangement method of the pixel units 120r, 120g, 120b, and 120m (i.e., the filter pattern 180r, the filter pattern 180g, the filter pattern 180b, and the second material portion 156 of the reflection pattern 150 respectively overlapped with the pixel units 120r, 120g, 120b, and 120m) is similar to that of FIG. 2. However, the areas of the pixel units 120g and 120m (i.e., the filter pattern 180g and the second material portion 156 of the reflection pattern 150 respectively overlapped with the pixel units 120g and 120m) are less than the areas of the other pixel units 120r and 120b (i.e., the filter patterns 180r and 180b respectively overlapped with the pixel units 120r and 120g).

Figure 9:
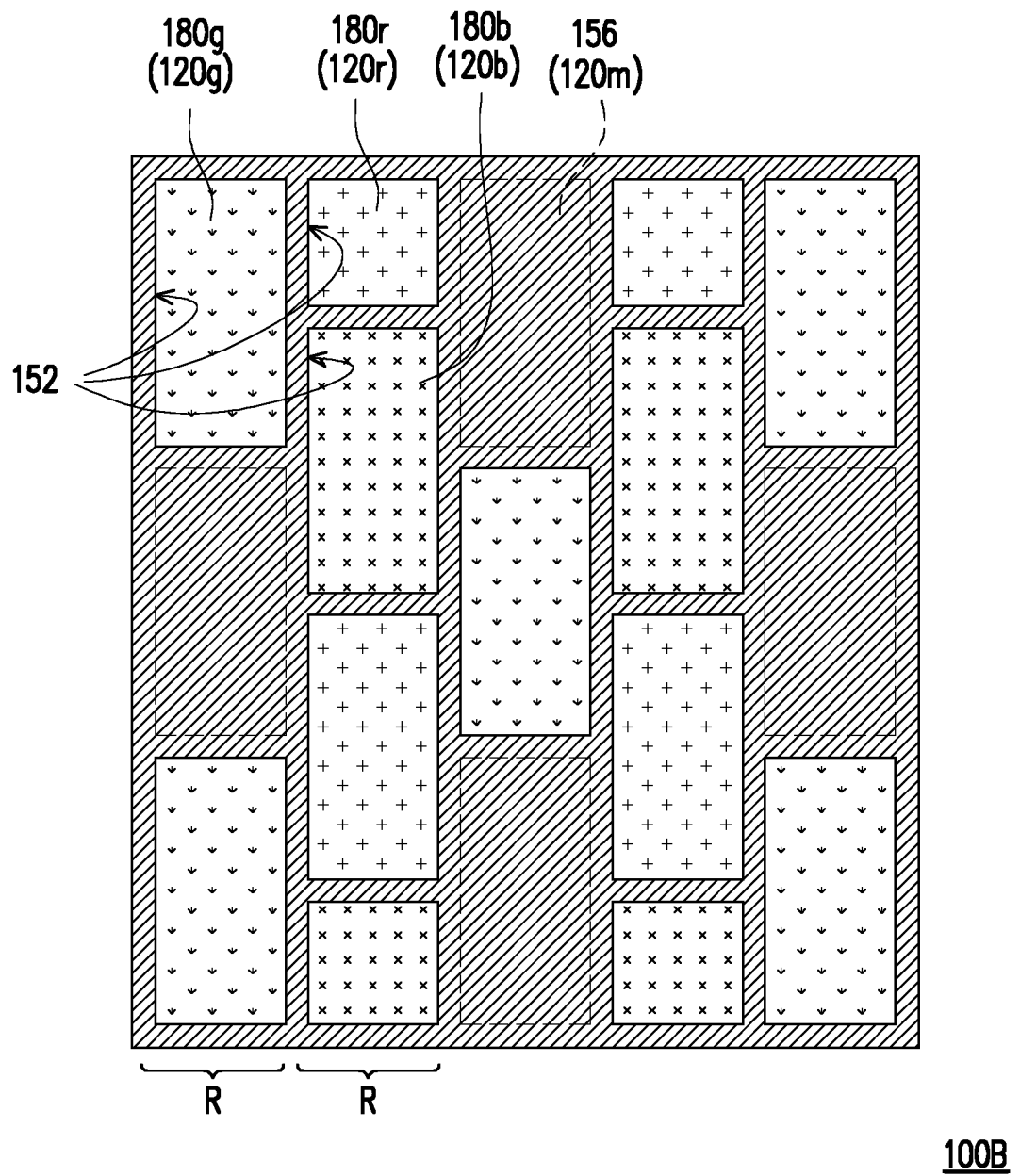
FIG. 9 is a top view of a display device of a mirror display module of yet another embodiment of the invention.

FIG. 9 is a top view of a display device of a mirror display module of yet another embodiment of the invention. Referring to FIG. 9, in a display device 100B, the arrangement method of the pixel units 120r, 120g, 120b, and 120m (i.e., the filter pattern 180r, the filter pattern 180g, the filter pattern 180b, and the second material portion 156 of the reflection pattern 150 respectively overlapped with the pixel units 120r, 120g, 120b, and 120m) is different from that of FIG. 2. Specifically, in the display device 100B, the plurality of pixel units 120r, 120g, 120b, and 120m (i.e., the filter pattern 180r, the filter pattern 180g, the filter pattern 180b, and the second material portion 156 of the reflection pattern 150 respectively overlapped with the pixel units 120r, 120g, 120b, and 120m) is arranged into a plurality of columns R, and the plurality of pixel units 120r, 120g, 120b, and 120m of two adjacent columns R are displaced from one another.

Figure 10:
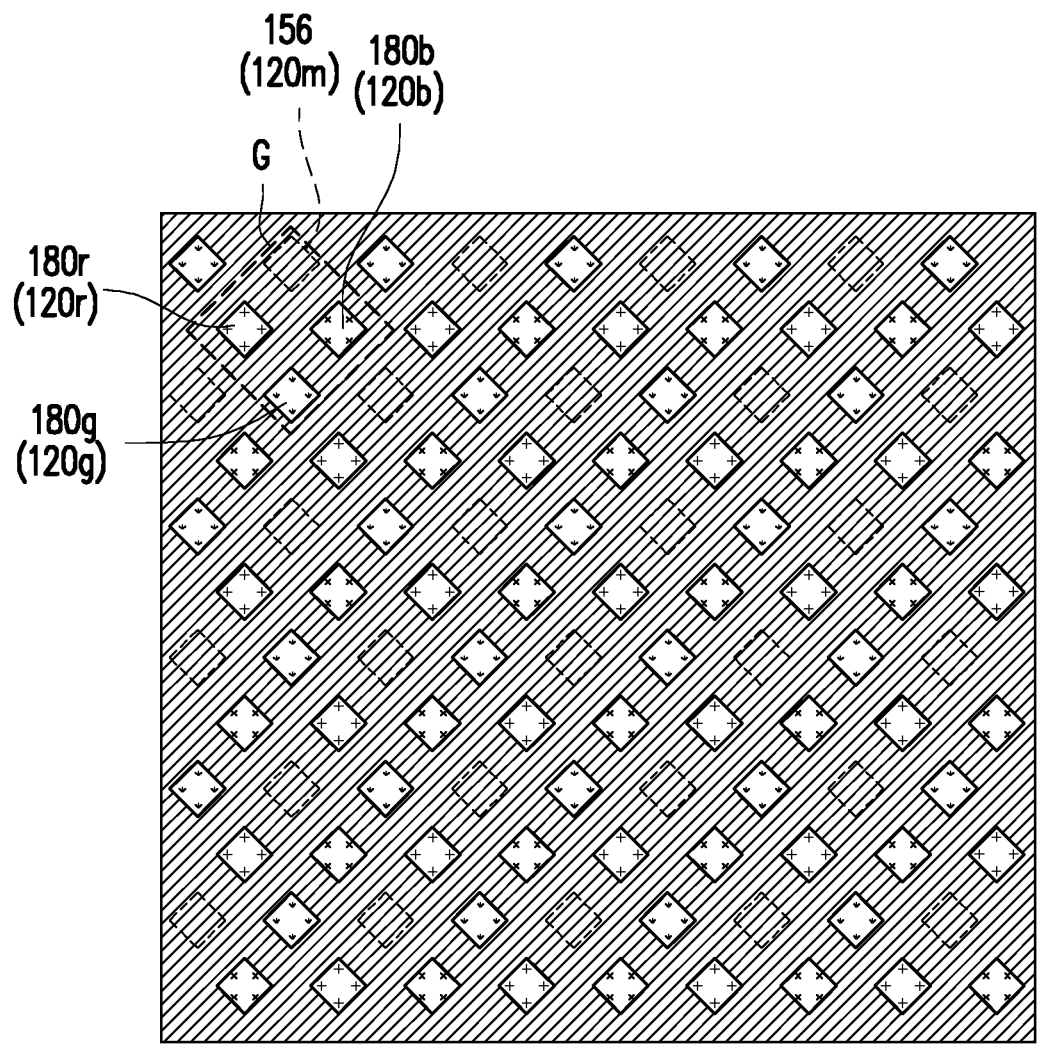
FIG. 10 is a top view of a display device of a mirror display module of still yet another embodiment of the invention.

FIG. 10 is a top view of a display device of a mirror display module of still yet another embodiment of the invention. Referring to FIG. 10, in a display device 100C, the arrangement method of the pixel units 120r, 120g, 120b, and 120m (i.e., the filter pattern 180r, the filter pattern 180g, the filter pattern 180b, and the second material portion 156 of the reflection pattern 150 respectively overlapped with the pixel units 120r, 120g, 120b, and 120m) is different from that of FIG. 2. Specifically, in the display device 100C, the plurality of pixel units 120 forms a plurality of pixel groups G, each of the pixel groups G includes the pixel units 120r, 120g, 120b, and 120m, and each of the pixel groups G is distributed in a diamond-shaped region.

The display devices 100A, 100B, and 100C of FIG. 8, FIG. 9, or FIG. 10 can be configured to replace the display device 100 of the mirror display module 1, 1A, 1B, 1C, or 1D of any embodiment above, and the resulting mirror display module is still within the scope of the invention.

Based on the above, the mirror display module of an embodiment of the invention reflects an ambient light beam using a reflection pattern having openings of the display device and does not reflect the ambient light beam using a transflective electrode of the electrochromic device of the prior art. Accordingly, the upper and lower electrodes (i.e., first transparent electrode and second transparent electrode) of the electrochromic device configured to drive the electrochromic material layer can both be designed as transparent electrodes such that the transmittance of the electrochromic device is high. Accordingly, the display light beam from the display device does not require excessive energy to penetrate the electrochromic device. Therefore, issues of the prior art such as power consumption, overheating, and large size can be alleviated.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A mirror display module, comprising:
a first substrate;
a plurality of pixel units disposed on the first substrate;
a second substrate disposed opposite to the first substrate;
a display medium layer located between the first substrate and the second substrate;
a reflection pattern disposed on the second substrate and located between the second substrate and the display medium layer, wherein the reflection pattern has a plurality of openings, and the openings are overlapped with at least a portion of the pixel units;
a third substrate, wherein the second substrate is located between the third substrate and the first substrate;
an electrochromic material layer located between the third substrate and the second substrate;
a first transparent electrode disposed on the third substrate and located between the third substrate and the electrochromic material layer; and
a second transparent electrode located between the electrochromic material layer and the second substrate.

2. The mirror display module of claim 1, wherein a reflectance of the reflection pattern is greater than 50%.

3. The mirror display module of claim 1, further comprising:
a fourth substrate located between the second transparent electrode and the second substrate.

4. The mirror display module of claim 1, further comprising:
a polarizer disposed between the reflection pattern and the display medium layer.

5. The mirror display module of claim 1, wherein the pixel units form a plurality of pixel groups, each of the pixel groups comprises a first pixel unit and a second pixel unit, one of the openings of the reflection pattern is overlapped with the first pixel unit, a material portion of the reflection pattern shields the second pixel unit, and the first pixel unit is configured to display a green color.

6. The mirror display module of claim 5, wherein the pixel groups are arranged in a plurality of columns and a plurality of rows, the first pixel units and the second pixel units of the pixel groups of each of the columns are alternately arranged in a column direction, and arrangements of first pixel units and second pixel units of any two adjacent rows are different.

7. The mirror display module of claim 6, wherein each of the pixel groups further comprises a third pixel unit and a fourth pixel unit, the openings of the reflection pattern are overlapped with the third pixel unit and the fourth pixel unit, and the third pixel unit and the fourth pixel unit are configured to display a red color and a blue color.

8. The mirror display module of claim 7, wherein the third pixel units and the fourth pixel units of the pixel groups are alternately arranged in the column direction, and arrangements of third pixel units and fourth pixel units of any two adjacent rows are different.

9. The mirror display module of claim 1, further comprising:
a wire grid polarizer disposed between the second transparent electrode and the second substrate.

10. The mirror display module of claim 9, wherein the wire grid polarizer comprises a plurality of metal wires, the metal wires are separated from one another and parallel to one another, and the plurality of metal wires is directly disposed on the second substrate.

11. The mirror display module of claim 1, further comprising:
a wire grid polarizer disposed between the second substrate and the display medium layer.

12. The mirror display module of claim 11, wherein the wire grid polarizer and the reflection pattern are a same film layer.

13. The mirror display module of claim 1, wherein the second transparent electrode is directly disposed on a surface of the second substrate facing away from the display medium layer, and the second transparent electrode is in contact with the surface of the second substrate.

14. A mirror display module, comprising:
a first substrate;
a plurality of pixel units disposed on the first substrate;
a second substrate disposed opposite to the first substrate;
a display medium layer located between the first substrate and the second substrate;
a reflection pattern disposed on the second substrate and located between the second substrate and the display medium layer, wherein the reflection pattern has a plurality of openings, and the openings are overlapped with at least a portion of the pixel units;
a third substrate, wherein the second substrate is located between the third substrate and the first substrate;
an electrochromic material layer located between the third substrate and the second substrate;
a first transparent electrode disposed on the third substrate and located between the third substrate and the electrochromic material layer; and
a second transparent electrode located between the electrochromic material layer and the second substrate, wherein the pixel units form a plurality of pixel groups, each of the pixel groups comprises a first pixel unit and a second pixel unit, one of the openings of the reflection pattern is overlapped with the first pixel unit, and a material portion of the reflection pattern shields the second pixel unit.

15. The mirror display module of claim 14, wherein a reflectance of the reflection pattern is greater than 50%.

16. The mirror display module of claim 14, wherein a material of the reflection pattern comprises copper, gold, platinum, aluminum, an aluminum alloy, chromium, nickel, ruthenium, silver, a silver alloy, or a combination thereof.

17. The mirror display module of claim 14, further comprising a wire grid polarizer disposed between the second substrate and the display medium layer, wherein the wire grid polarizer and the reflection pattern are a same film layer.

18. The mirror display module of claim 14, wherein the first pixel unit is configured to display a green color, the pixel groups are arranged in a plurality of columns and a plurality of rows, the first pixel units and the second pixel units of the pixel groups of each of the columns are alternately arranged in a column direction, and arrangements of first pixel units and second pixel units of any two adjacent rows are different.

19. The mirror display module of claim 18, wherein each of the pixel groups further comprises a third pixel unit and a fourth pixel unit, the openings of the reflection pattern are overlapped with the third pixel unit and the fourth pixel unit, and the third pixel unit and the fourth pixel unit are configured to display a red color and a blue color.

20. The mirror display module of claim 19, wherein the third pixel units and the fourth pixel units of the pixel groups are alternately arranged in the column direction, and arrangements of third pixel units and fourth pixel units of any two adjacent rows are different.

* * * * *